March 2, 1954  H. C. KEYSOR  2,670,950
SPRING BAND
Filed July 14, 1950
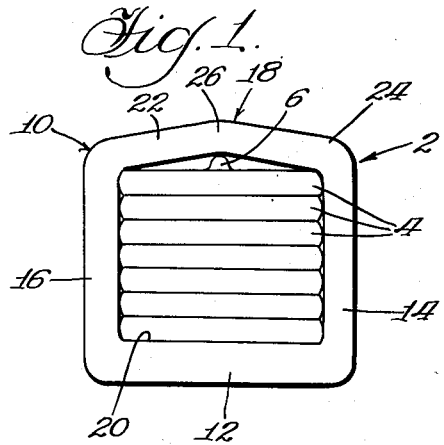
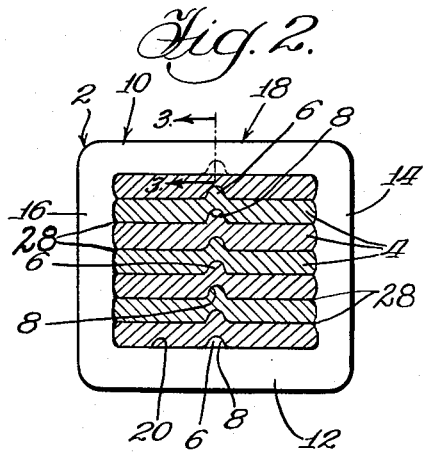
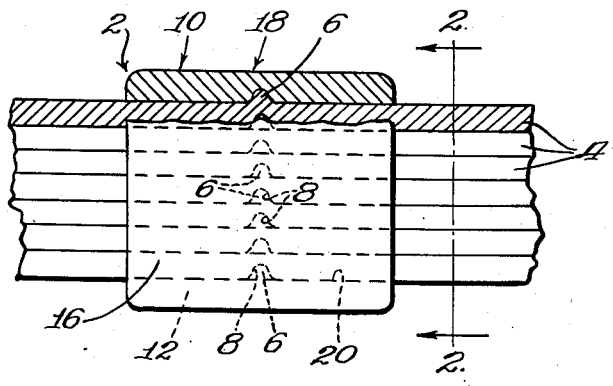
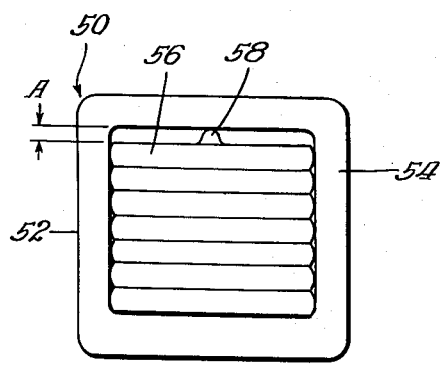
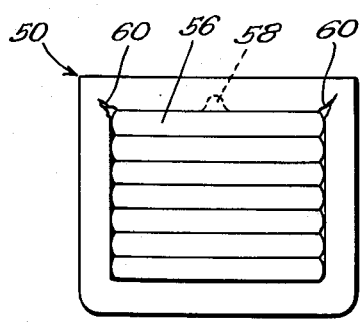
INVENTOR.
Harold C. Keysor
BY
Attÿ.

Patented Mar. 2, 1954

2,670,950

UNITED STATES PATENT OFFICE 2,670,950

SPRING BAND

Harold C. Keysor, Chicago, Ill., assignor to American Steel Foundries, Chicago, Ill., a corporation of New Jersey Application July 14, 1950, Serial No. 173,819

4 Claims. (Cl. 267—53)

1

This invention relates to laminated springs and more particularly to heavy duty leaf springs of the type commonly employed on railway rolling stock, such as for instance locomotives.

For years various arrangements have been tried to provide a simple and satisfactory securement for the leaves and which would have long life in service. These arrangements in general have proved either short-lived or ineffective or so complicated and costly that their general application was precluded.

In a standard type of leaf spring, a set of superposed leaves are secured together by a band, the leaves being provided with interfitting complementary projections and recesses at intermediate portions thereof for holding the leaves against relative longitudinal displacement. On the basis of cost and adaptability for mass production, the only practical method of applying the band, as is standard practice, involves heating the band and introducing it over the assembled leaves and about the portions thereof having the complementary projections and recesses; the band is then being pressed and shrunk about the leaves to maintain them in assembly. During the shrinking and pressing operation, the projection on the outermost leaf is imbedded into the band whereby the band and leaves are interlocked. The band heretofore used in this method comprised the form of a closed, integral rectangular loop large enough to pass easily over the leaves and the projection on the outermost leaf.

Assemblies made according to this practice, however, feature several serious drawbacks in that the bands are quickly broken and easily enlarged and consequently loose fitting which permits separation of the leaves and early failure thereof.

I have discovered several reasons for failure of these bands, and for convenience in explanation, I shall term the portions of the band which extend transversely of the leaves along the opposite edges thereof as side sections and those which extend the width of the leaves and overlie and underlie the same as top and bottom end sections, respectively.

My studies revealed that the principal reason for band failure was due to the form of the band which provided an excessive length of metal which could not be pressed into close embracing relationship with the leaves without forming folds in the corners of the band. I have found these folds principally in the upper corners of the band, that is at the juncture between the top end section and the side sections. These folds are easily

2 spread during working of the spring and account for the looseness.

I have also discovered that the excess length of metal promotes bulging of the top section upwardly when the side sections are being pressed against the edges of the leaves and also promotes bulging of the side sections outwardly when the top and bottom sections are being pressed against the leaves. This alternate pressing of the side sections and then the end sections is continued about eight or ten times until the workman is satisfied that the band is fitted on the spring as best as could be expected. This operation, I have discovered, forms incipient cracks at the corners principally between the top end section and the side sections. These cracks develop rapidly during usage of the spring and determine early failure.

The principal object of the invention is to provide a spring band which may be easily applied to assembled leaves and wherein the length of the band is reduced to the minimum.

A further object of the invention is to provide a band which is inexpensive to produce and is simple and provides a satisfactory securement for the leaves and has long life in service.

A more specific object of the invention is to provide a closed spring band generally pentagonal in cross-section wherein one side forms the bottom of the band and seats against the bottom leaf and the two adjacent vertical sides bear against opposite edges of the spring leaves, the upper ends of the vertical sides terminating immediately adjacent to the upper surface of the top leaf and merging into upwardly converging top sides of the band, the apex of convergence being vertically aligned with the projection or nib on the top leaf and passing thereover. I have found that this band, when pressed and shrunk according to common practice as described, entirely eliminates the above-mentioned faults of previous bands.

These and other objects of the invention will become more apparent from the specification and the drawings wherein:

Figure 1 is an edge view of my novel spring band applied to assembled leaves prior to shrinking and pressing the band to the leaves;

Figure 2 is a view similar to Figure 1 and showing the band pressed and shrunk on the leaves, the leaves being shown in cross section;

Figure 3 is a side elevational view of my novel spring assembly partly in section, the section being taken substantially on the line 3—3 of Figure 2;

Figure 4 is a view similar to Figure 1 showing a conventional band; and

Figure 5 is a view similar to Figure 2 showing the conventional band pressed and shrunk on the leaves.

Describing the invention in detail, the spring assembly, generally indicated 2, is of the so-called semi-elliptic type. It is obvious however, that the invention is not limited to a particular type of spring for its application is contemplated to any type of laminated leaf or plate spring wherein nibbed leaves or plates are tightly held together by a band or clip. It will be noted that the spring assembly 2 comprises a set of superposed leaves or plates 4, 4 and that each leaf comprises on an intermediate portion thereof, a substantially centrally located upwardly extending nib or projection 6 and a downwardly open recess 8 below the projection. The nib 6 of each leaf extends into the complementary recess of the leaf thereabove. Thus, the leaves are interlocked with each other against longitudinal displacement.

In the assembly of the spring, the leaves are positioned in superposed relationship as in Figure 1, and a band generally indicated 10 is sleeved onto the intermediate portions of the leaves.

The band 10 is of pentagonal form and comprises a bottom section 12, substantially parallel side sections 14 and 16 extending perpendicular from opposite ends of the bottom section, and a top end section generally indicated 18 interconnecting the upper ends of the side sections.

The bottom section extends across the width of the leaves beneath the outermost bottom leaf and has flat-face engagement on its inner side 20 with the outer side of the bottom leaf. The length of the inner side 20 of the bottom section of the band is approximately the width of the springs and of the order to conveniently admit the band on the leaves.

The side sections 14 and 16 extend along the opposite edges of leaves to a height approximately that of the stack of leaves and on their inner sides engage the leaves. The sections 12, 14 and 16 are arranged in the form of a U.

The top section comprises two segments 22 and 24 which are located at opposite sides of the vertical plane bisecting the assembly longitudinally. The segments 22 and 24 are arranged in a V and converge outwardly of the band (as shown, the convergence is vertical) and are interconnected at their adjacent ends to form an apex 26 of the V directly above or in alignment with the upwardly extending nib 6 of the outermost top leaf of the spring. The outer ends of the segments 22 and 24 merge into the upper extremities of the side sections 14 and 16, respectively, substantially in the plane of the outer surface of the top leaf or plate 4.

It will be noted that the interior of the apex 26 just clears the nib.

Thus, it will be seen that the length of the band is shortened the maximum amount possible.

The band is then subjected to the conventional shrinking and pressing operation until it snugly embraces the leaves, as shown in Figures 2 and 3. It will be seen that the band and springs are interlocked against longitudinal separation by the nib on the top outermost leaf being imbedded in the top section 18 in the region of the apex 26.

Examination of the improved bands shows that there are no cracks in the corners. This is somewhat helped by forming the exteriors of the upper corners rounded.

In Figures 4 and 5 is shown a spring assembly with a conventional band 50. It will be readily seen by a comparison of Figures 1 and 4 that the conventional band has greater length by slightly less than the distance indicated at A that the two side sections 52 and 54 must extend above the top surface of the top leaf 55 to the top of the nib 58 on the top leaf. It will be seen that this excess length, together with the length of section of the top segment 58 between each side section and the center of nib 56, approximate the two sides of a right triangle which necessarily are longer than the hypotenuse, which sections 22 and 24 of applicant's top section 18 approximate.

In Figure 5 are shown the folds at 60, 60 at the top corners which form the incipient cracks in the conventional band.

Thus it will be seen, the improved band is materially shorter than the conventional band and that when subjected to the same operations as the conventional band provides a satisfactory fastening arrangement for the leaves and is tight and devoid of cracks or folds. Slight oversize length at the top of the improved band is readily dissipated into the width of the band which is increased slightly after being pressed against the springs and also enters in between the leaves as at 28, 28.

The conventional band, however, has too great length and thus results in a loose fit and folds in the corners.

I claim:

1. A rigid spring band adapted to be compressed in a heated condition to snugly embrace a group of leaf springs interlocked by complementary projections and recesses, comprising in the precompressed stage a solid metal ring having five sides of substantial thickness, three of the sides being dimensioned approximately equal to the related peripheral dimension of the associated spring leaves and the two adjacent remaining sides being arranged to converge toward and have their juncture disposed over a projection on the springs along the shortest distance possible.

2. A rigid spring band adapted to be compressed in a heated condition to snugly embrace a group of leaf springs interlocked by complementary projections and recesses, comprising in the precompressed stage a one-piece solid metal ring having five sides, each side being formed of a flat segment of metal of substantial thickness, one segment forming an end section of a length substantially equal to the width of the spring group, two segments at opposite ends of said one segment extending perpendicular therefrom in adjacent relationship and having a length substantially equal to the depth of said spring group, the two remaining sections being joined together at one of their ends and diverging toward said one section, one of said remaining sections merging at its other end into the other end of one of said two segments and the other of said remaining sections merging at its other end into the other end of the other of said two sections, said band having a minimum inner periphery for ready sleeving of the band onto said assembly.

3. A rigid spring band adapted to be heated and pressure formed into a closed loop having an opening of rectangular form to tightly surround a group of leaf springs, said band comprising a flat surfaced bottom segment, spaced parallel equally upstanding flat surfaced side segments integrally formed on opposite ends of the bottom segment, the height of said side segments being equal to the height of the related group of springs, and a pair of flat surfaced top segments, each integrally formed with the related side segment in an obtuse angle relation thereto, said top segments merging with each other along a line centrally of the band to form an apex.

4. A rigid spring band adapted to be heated and pressure formed into a closed loop having an opening of rectangular form to tightly surround a group of flat leaf springs, said band comprising a flat surfaced bottom segment, spaced parallel equally upstanding flat surfaced side segments integrally formed on opposite ends of the bottom segment, the height of said side segments being equal to the height of the related group of springs, and a plurality of top segments integrally formed with the related side segment and in nonperpendicular relation thereto, said top segments merging with each other centrally of the band to form an apex.

HAROLD C. KEYSOR.

References Cited in the file of this patent

UNITED STATES PATENTS

| Number | Name | Date |
|---|---|---|
| 245,097 | Spaulding | Aug. 2, 1881 |
| 2,021,173 | Clark | Nov. 19, 1935 |
| 2,026,404 | Strandberg et al. | Dec. 31, 1935 |
| 2,106,411 | O'Donnell | Jan. 25, 1938 |
| 2,253,255 | Weber | Aug. 19, 1941 |
| 2,297,941 | Cleary | Oct. 6, 1942 |